(12) United States Patent
Job

(10) Patent No.: US 6,508,460 B2
(45) Date of Patent: Jan. 21, 2003

(54) MOTOR VEHICLE AIR SPRING HAVING AN ANCILLARY VOLUME

(75) Inventor: Heinz Job, Neustadt (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/863,267

(22) Filed: May 24, 2001

(65) Prior Publication Data

US 2001/0045693 A1 Nov. 29, 2001

(30) Foreign Application Priority Data

May 24, 2000 (DE) ......................................... 100 25 753

(51) Int. Cl.$^7$ ................................................. F16F 9/04
(52) U.S. Cl. ................................. 267/64.21; 267/64.24
(58) Field of Search ........................... 267/64.21, 64.23, 267/64.24, 64.26, 64.27, 122, 126

(56) References Cited

U.S. PATENT DOCUMENTS 4,669,710 A * 6/1987 Horvat .................... 267/64.21

FOREIGN PATENT DOCUMENTS

DE 3723033 2/1988

* cited by examiner

Primary Examiner—Christopher P. Schwartz
(74) Attorney, Agent, or Firm—Walter Ottesen

(57) ABSTRACT

A motor vehicle air spring has an air volume subdivided into an air spring volume and an ancillary volume. The two volumes (4, 6) are connected to each other by a line (8) having a cross section which can be switched or continuously adjusted by a valve (12). The valve (12) has two roll membranes (56, 58) which are arranged in mutual opposition. The intermediate space (60) between the roll membranes (56, 58) preferably communicates with the atmosphere. The two mutually opposingly mounted roll membranes (56, 58) can be joined to form a single double roll membrane (76). Preferably, the valve body (34) as well as the bore (62) of the valve housing (36) is configured so as to be cylindrical so that the constant effective diameter (Dw) of the roll membranes (56, 58) results which is independent of the deflection of the valve body (34). The valve (12) is applicable to all areas where a large cross section has to be completely cleared with small switching times and forces and where only little switching energy is available.

12 Claims, 8 Drawing Sheets

MOTOR VEHICLE AIR SPRING HAVING AN ANCILLARY VOLUME

BACKGROUND OF THE INVENTION

When utilizing air springs in passenger cars, a largest possible air volume is to be used to obtain optimal suspension comfort. Mostly, there is insufficient space at the wheel because of chassis components such as a longitudinal control arm, brake and drive shaft. For this reason, this large air volume is subdivided into an air spring volume and an ancillary volume (see FIG. 1a). The ancillary volume can then be accommodated at a location in the vicinity such as in the engine compartment, in the longitudinal support, in the trunk, et cetera. Both volumes are then connected by a line having a cross section which is of such a dimension that an air exchange can take place very rapidly and without significant pressure loss. If the vehicle travels on cobblestones, for example, then the air spring contracts and expands in correspondence to the road speed at a high frequency. Each spring contraction operation and each spring expansion operation is associated with an air exchange which may not be hindered because the suspension comfort would otherwise be reduced.

A high suspension comfort means a reduced spring stiffness. In accordance with the above, this is achieved with a large air spring volume. It is, however, a disadvantage that the steering becomes loose. Likewise, for a low spring stiffness, the driving performance changes when braking, when accelerating, and in travel through a curve as well as with rapid avoidance maneuvers. This change in driving performance is in the direction of instability which is unwanted because driving safety is thereby affected.

In order to resolve this conflict between comfortable air spring design and stability of the driving performance, the above-described line is provided with a valve, which can be blocked (see FIG. 1b). During normal driving conditions, the valve is open and is open in such a manner that the valve presents no significant hindrance for the air exchange between the air spring and the ancillary volume. If the vehicle is now braked, accelerated or driven in a curve or is compelled to execute a rapid defensive maneuver, then the valve is abruptly closed by a control apparatus which can detect the driving state by means of sensors. Thus, the air spring and the ancillary volumes are separated from each other with the consequence that only the air spring volume is available for the suspension operation. The spring stiffness is therefore higher and the vehicle has a more stable driving performance.

The valve is again opened as soon as the control apparatus detects that none of the above-described driving conditions is present any longer. This opening operation has to be carried out in such a manner that a pressure difference between the air spring volume and the ancillary volume, which has possibly formed in the meantime, can be slowly compensated so that there is therefore no sudden drop or upward bucking of the vehicle. Only when the pressure compensation is complete can the valve again be completely opened.

Valves for this task are known. These valves are mostly realized in the assembly of trucks as precontrol valves. A small electromagnetic valve switches a larger pneumatically actuated valve (FIG. 2). The alternative is an electromagnetic actuation of the valve. In the manufacture of passenger cars, no corresponding compressed air source having sufficient power is present in order to switch the pneumatically actuated valve. For this reason, only the electromagnetic actuation remains (FIG. 3).

If one wants to continuously adjust the cross section to be cleared by the valve in order to, for example, obtain specific spring frequencies or to make possible the described slow pressure compensation, then the valve must operate as independently as possible of the existing pressure differences in the system and its inherent friction forces. Forces caused by pressure differences should operate so that they mutually cancel each other and therefore have no influence on the switching or adjusting operation of the valve. Friction forces should be as small as possible and have a constant level. If these requirements are satisfied, then a specific valve setting is assigned to each specific current level supplied to the electromagnet. A continuous clearance of the cross section is thereby provided.

In order to be as independent of pressure as possible, the pressure relief principle shown in FIG. 4 is suitable. A complete pressure relief is, however, not possible (for example, for a star nozzle and a round nozzle), even for the principle illustrated. The reason for this is that a plate membrane would be necessary for pressure relief. The plate membrane, however, has an effective diameter Dw which changes in dependence upon service life (because of stretching) and, in addition, is dependent upon axial and radial built-in tolerances. A roll membrane is not suitable for this purpose because this membrane is turned inside out with a pressure reversal and would thereby be destroyed. This also applies to the plate membrane even though this membrane is somewhat less sensitive.

The same problems (non-constant active diameter and inversion) result also when a slider valve is provided with a plate membrane or roll membrane (FIG. 5). If the slide valve is provided with a seal (FIGS. 6a and 6b), then this seal is burdened with wear and leakage. Likewise, friction forces must be overcome when switching and controlling and these forces change in dependence upon pressure. This can go so far that the friction force is greater than the electromagnetic force and the valve can therefore not switch. A reliably switching valve or a valve wherein each specific current level is assigned to a specific valve position is therefore not realizable therewith.

It is conceivable to utilize a slider valve with a seal (FIGS. 6a and 6b) wherein only small pressure differences occur. In the area of passenger car air spring systems, large pressure differences however occur, which are caused by rapid spring contraction and expansion, so that, at the present time, a use is only possible under reduced requirements.

Furthermore, an electromagnet is required for valve actuation which has a large number of turns with low electrical resistance and therefore has a large valve mass, large structural space and incurs high costs. Also, the armature of the valve would be accelerated toward the valve seat when switching on the actuator current. As a consequence of the large electromagnetic force, which must be made available, large speeds could occur so that large decelerations would become effective when striking the valve seat, that is, the armature generates a noise when striking the valve seat which can be in the nature of a hammer bolt.

In air springs systems for trucks, valves exist for hammer-like closure and slow opening on the basis of pneumatic actuation.

In passenger car air springs, magnetic valves are known which can be adapted to the larger line cross section. Additionally, a pressure relief is provided in order to reduce the acting forces. However, all these solutions are burdened with friction and therefore do not permit a trouble-free adjustment and control. In the manufacture of trucks, the valves are pneumatically actuated because the pneumatic has a high energy density. The high energy consumption (pressurized air escapes) is not significant there. Likewise, the switching noise is also of not much consequence.

SUMMARY OF THE INVENTION

It is an object of the invention to provide a motor vehicle air spring wherein the valve used has the following advantageous characteristics, namely:
a) continuous adjustability;
b) independence of existing pressure differences;
c) low leakage;
d) very short reaction time;
e) stable performance in the presence of flow forces;
f) low mass;
g) low friction;
h) adequate service life;
i) small structure;
j) little electrical energy consumed;
k) finely metered continuous opening possible;
l) the complete cross section cleared without throttling;
m) cost effective; and,
n) no disturbing noises.

The motor vehicle air spring of the invention includes: an air spring volume; an ancillary volume; a connecting line connecting the volumes to each other and having a cross section through which air can flow between the volumes; a valve unit mounted in the connecting line; the valve unit having a valve housing defining a valve seat; a valve body movable in the valve housing between a first position wherein the valve body is in contact engagement with the valve seat to close a flow path between the air spring volume and the ancillary volume and a second position wherein the flow path is at least partially open; the valve housing and the valve body conjointly defining an interface region; first and second roll membranes mounted between the valve body and the housing in the interface region; and, the first and second roll membranes being mounted to roll oppositely with respect to each other with the movement of the valve body.

According to the invention, two roll membranes are built into the air spring valve so as to be opposed to each other, whereby the advantageous characteristics and operation described below are obtained.

There is no friction in the adjustment of the valve except for rolling friction and resistance because of rubber deformations. Inversion or destruction of the roll membranes is avoided because of the mutual opposing arrangement thereof. The pressure always operates on the correct side. The space between the two roll membranes communicates with the atmosphere. In this way, it is ensured that the pressure in the rolling lobe is always greater than on the opposite side; that is, on the side between the roll membranes. In this way, an inversion is reliably avoided. Because of the constant effective diameter Dw of the roll membranes, it is possible to design the seat diameter Ds so that all pressure forces always cancel each other. The adjusting force is thereby independent of the actual pressure present in the air spring system. In this way, a trouble-free control is possible without a measurement-technical determination of the pressure. In contrast to plate membranes, the complete pressure compensation is maintained even over the entire service life with the roll membranes according to the invention. The reason for this is that the occurring lengthening does not lead to any change of the effective diameter Dw.

Compared to valves having Fowler seals (FIGS. 6a and 6b), the valve of the invention affords the advantage that no leakage can occur. Leakage can occur only via diffusion of the air through the membrane. This leakage is, however, less by many orders of magnitude.

A further advantage is the increased service life. No wear results because of the absence of friction. In this way, the service life is not limited by friction. Because of the non-presence of friction, the valve body can be made of a material having a lower density. As a consequence of the lesser weight, lower acceleration forces (electromagnetic forces) are sufficient so that the electromagnets can be designed smaller. In this way, advantages are, in turn, obtained, namely: smaller structural space for a smaller electromagnet and less switching noise because of a lower mass of the armature and of the valve body. Because of the reduced friction, shorter switching times are possible without simultaneously increasing the electromagnet and the switching noise. Even fewer turns of the electromagnet are sufficient with less current. As a consequence of the fewer turns, the valve is more cost effective, smaller, and lighter than comparable valves. The current can be reduced because of the low friction so that less energy is consumed. The valve is also insensitive to flow forces and has therefore a stable characteristic line.

The use of a step motor as a drive makes possible a precise positioning and an energy switch-off after reaching the desired position. When utilizing a piezo actuator as a drive, the following advantages are obtained: a very low consumption of energy, very high positioning accuracy and very short reaction time. In combination with an electrochemical actuator, the following advantages are obtained: a very low consumption of energy; very high holding forces; high accuracy with respect to positioning even after switching off the energy supply; and, a defined fail-safe condition.

Advantages obtained when implementing with a pneumatic actuator: very short positioning times and a small control valve.

The roll membrane can, preferably, be utilized to completely compensate a star nozzle valve against pressure forces without having to increase the stroke.

The valve of the invention can be used in all other areas where a large cross section has to be completely cleared for short switching times and where only little switching energy is available.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
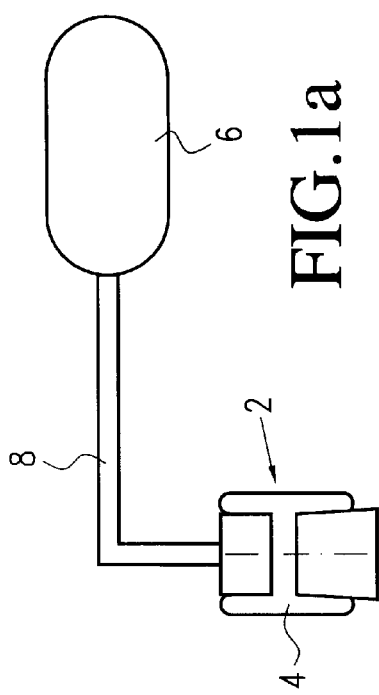
FIGS. 1a and 1b are schematics of an air spring each with an ancillary volume.

As mentioned initially herein, a comfortable motor vehicle air spring 2 (FIG. 1a) preferably has an ancillary volume 6 when space conditions are tight. Here, the air spring volume 4 of the air spring 2 and the air volume 6 of an ancillary vessel are connected via a line 8 having a large cross section.

Figure 1B:
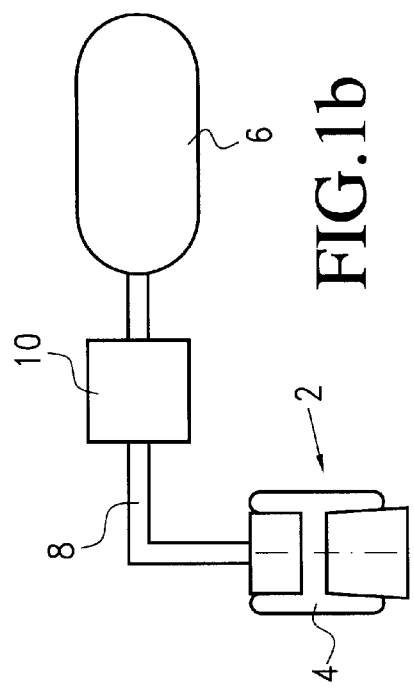
Figure 2:
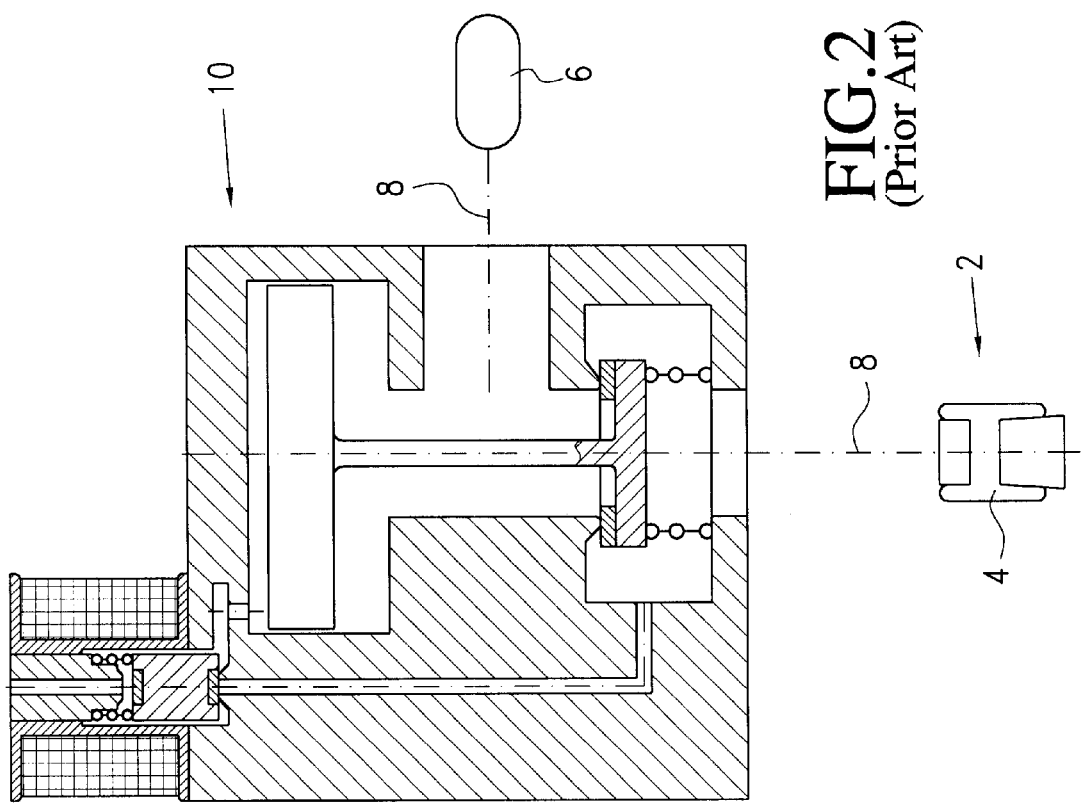
FIG. 2 is a longitudinal section view through a conventional truck air spring valve (a so-called precontrol valve)
Figure 3:
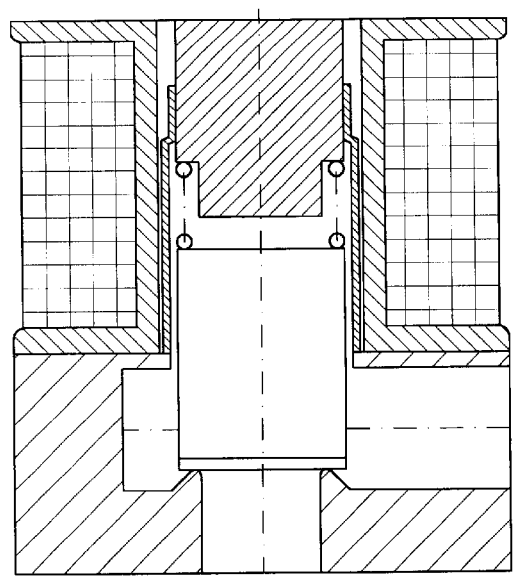
FIG. 3 shows a conventional electromagnetically actuable air spring valve in longitudinal section.
Figure 4:
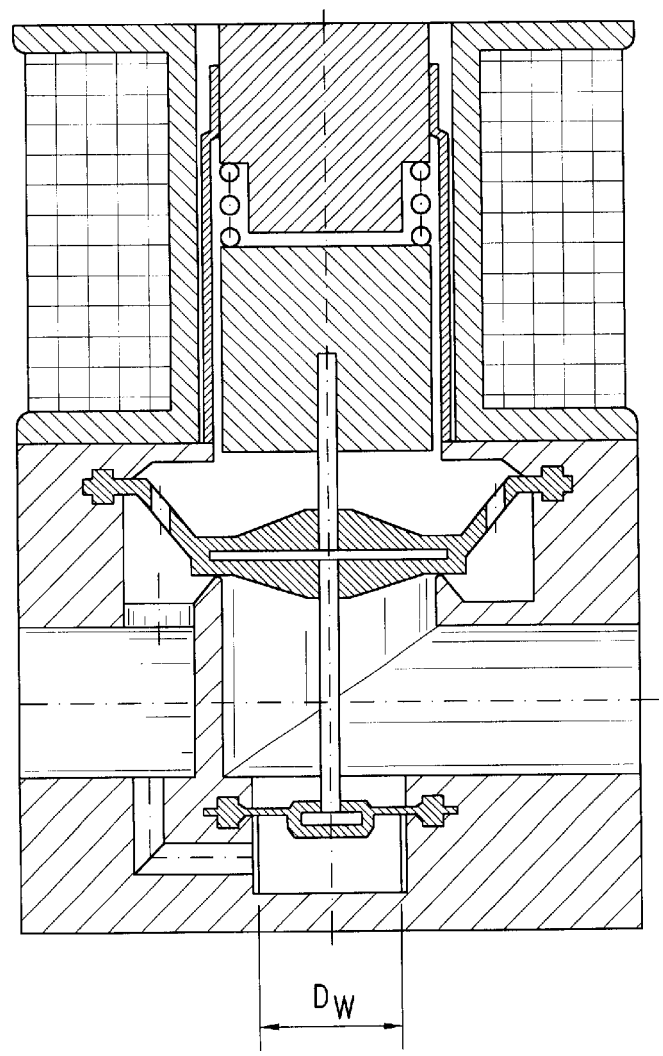
FIG. 4 is a schematic, in longitudinal section, of an electromagnetically actuable air spring valve which functions in accordance with the pressure-relief principle.

In order to be able to adjust a comfortable air spring 2 harder than normal in critical driving situations, the connecting line 8 can be blocked (FIG. 1b) by means of a valve (valve unit 10) between the air spring volume 4 and the ancillary volume 6. This has the consequence that the spring action is then realized exclusively by the air spring volume 4.

The valves shown in FIGS. 2 to 6b are conventional and are for air springs 2 having ancillary volumes 6 and have the disadvantages described initially herein.

Figure 6B:
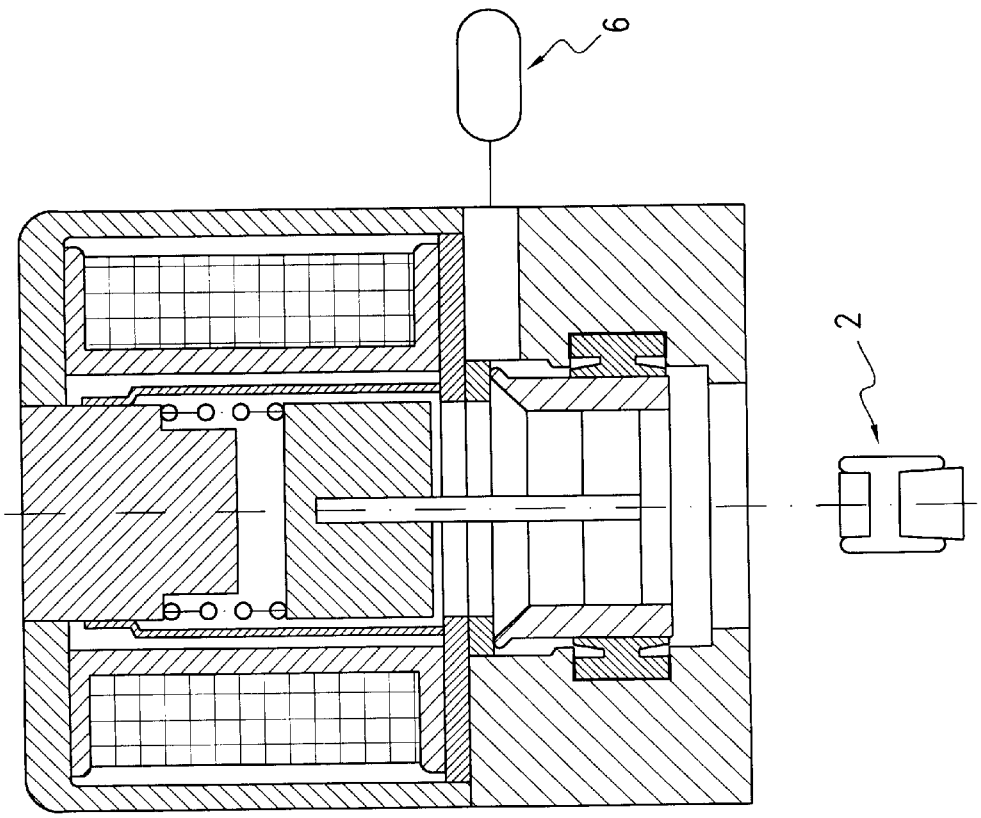
FIG. 6b shows the conventional slide valve of FIG. 6a in the closed state.
Figure 5:
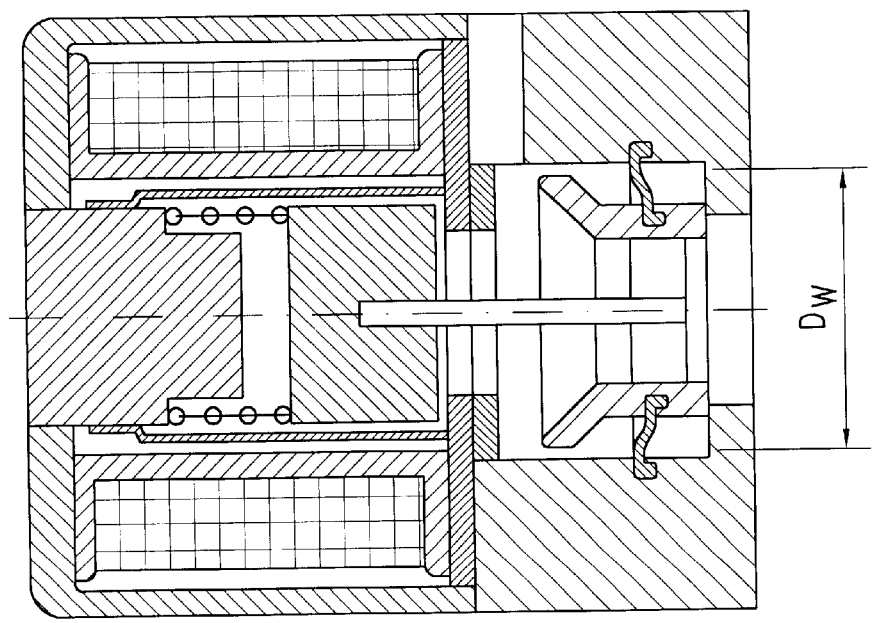
FIG. 5 is a so-called slide valve of conventional construction and is shown in longitudinal section.
Figure 6A:
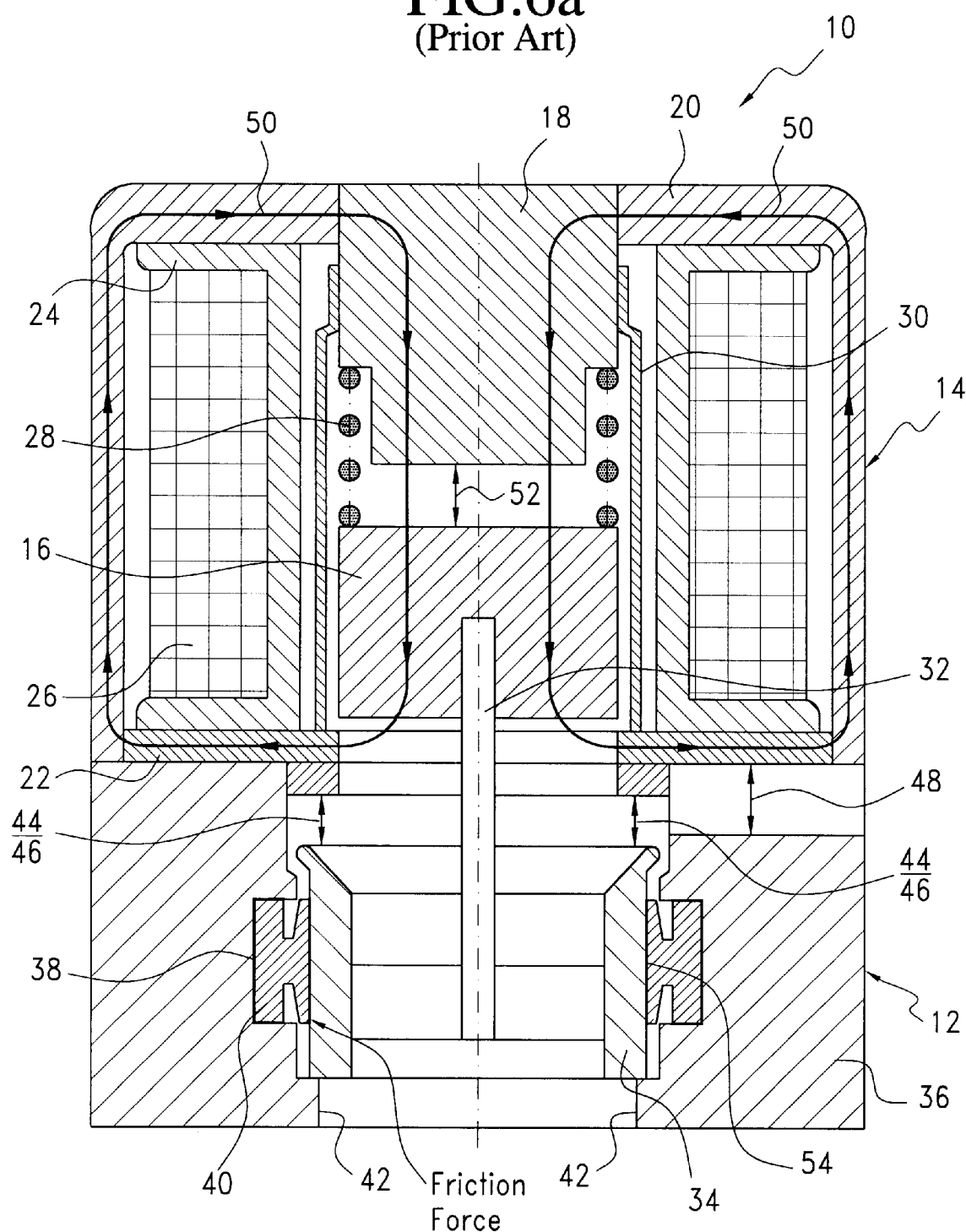
FIG. 6a is a schematic of a conventional slide valve having a seal and shown in longitudinal section and in the open state.

The valve unit 10 comprises the valve 12 and an actuating device 14. The actuating device 14 can, for example, be an electromagnet as shown in FIGS. 6a and 6b. The electromagnet includes the following parts: armature 16, pole piece 18, yoke 20, yoke disc 22, coil carrier 24, coil 26, spring 28, guide tube 30 and connecting rod 32. The connecting rod is connected to the valve body 34. These parts are independent of the actuating principle used and are therefore exchangeable.

The valve 12 comprises a valve housing 36, valve body 34, valve seat 38 and seal 40. In the case of FIGS. 6a and 6b, the seal is configured as a collar seal.

In the basic state, the valve 12 is open. Here, the spring 28 presses the armature 16 downwardly and the armature 16 moves the valve body 34 downwardly via the connecting rod 32 until the valve body strikes a stop 42. The stop 42 is so positioned that the stroke 44 does not become greater than necessary. The cross section 46, which is cleared by the valve 12, should be as large as the line cross section 48. The cleared cross section 46 results from: (stroke*Ds*Π). The stroke 44 should not be greater than computed above because, otherwise, for a rapid closing, a longer stroke must be passed through which takes longer and therefore increases the closure time.

In this basic state, the air spring volume 4 and the ancillary volume 6 are connected to each other without significant cross sectional reduction so that an unimpeded exchange of air is possible when the air spring contracts and expands.

If the vehicle is now braked, accelerated and/or driven in a curve so that the control (not shown) can detect that an unstable driving situation could occur, the control system controls the actuating device 14 (in FIG. 6, the valve electromagnets). The current, which flows through the coil 26, generates a magnetic field. The magnetic flux 50 flows through yoke 20 and yoke disc 22, armature 16, air gap 52 and pole piece 18. Here, yoke 20 and yoke disc 22 have the task to guide and bundle the magnetic flux 50 so that no unnecessary magnetic losses occur.

The air gap 52 is the largest hindrance in the path of the magnetic flux 50. All energetic systems are designed for the least energy. For this reason, the armature 16 moves against the spring force and against the friction force to the pole piece 18 so that the air gap 52 is reduced. The magnetic flux 50 has a lesser resistance to overcome, that is, a state of lower energy is arrived at.

The armature 16 is connected to the valve body 34 by the connecting rod 32. For this reason, the valve body 34 is pulled upwardly. The sealing edge 54 of the valve body 34 is pressed against the valve seat seal 38. In FIG. 6b, the path from the air spring 2 to the ancillary volume 6 is blocked. Only the air spring volume 4 can participate in the spring or suspension operation.

In this state, pressure changes occur because of the contraction and expansion of the air spring 2. So that the valve body 34 is not pressed out of its position because of the pressure forces, the pressure forces, which act above and below on the valve body 34, must be equal. Here, the space is one wherein the same pressure is present everywhere. For this reason, different pressure forces can only occur if the pressure areas would be different. In order to avoid pressure areas of different sizes, the diameter of the seat Ds and the effective diameter Dw are of the same size in FIGS. 7a to 7d. The pressure forces are therefore compensated.

The sealing collar 40 is subjected to load in the closed state. The sealing collar 40 must prevent air from the air spring volume 4 from reaching the ancillary volume 6 around the sealing seat 38. This is achieved in that the air pressure presses the sealing lip 54 against the valve body 34 and thereby establishes a seal. However, friction force occurs here and the magnitude of the friction force is dependent upon the applied force and therefore upon the air pressure which continuously fluctuates. This is one of the disadvantages initially mentioned herein.

If the coil current is switched off because the control has detected that no driving state is present critical to stability and therefore switching should take place into the comfortable air spring state, the spring 28 presses the armature 16 against the friction force in the downward direction. The valve 12 is again open. Air spring volume 4 and ancillary volume 6 are connected completely to each other and both volumes (4, 6) can be used for suspension whereby a comfortable spring performance is provided.

Figure 7A:
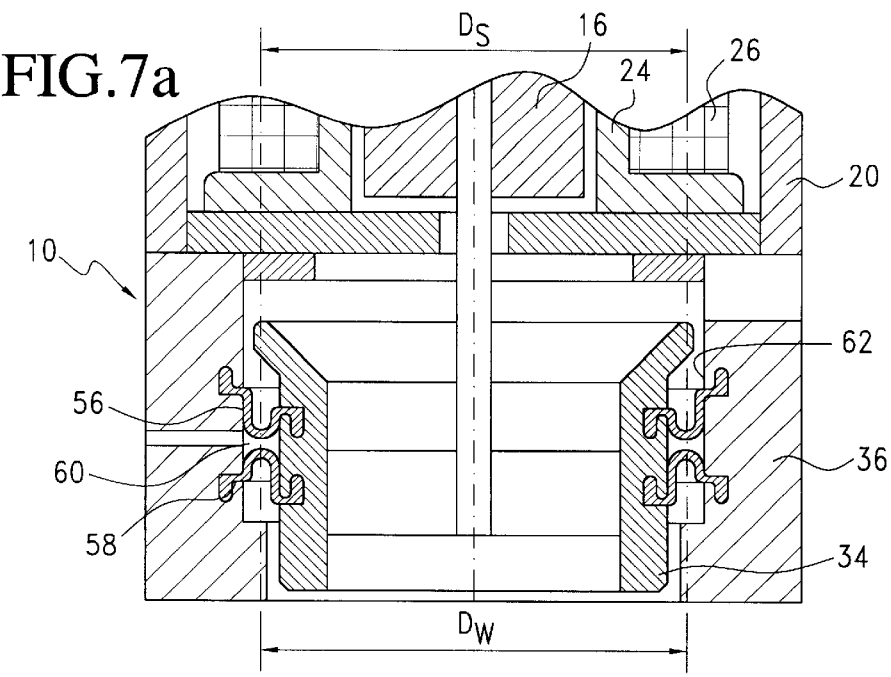
FIG. 7a is a schematic, in longitudinal section, of an air spring valve according to the invention and equipped with two roll membranes and shown in the open state.
Figure 7B:
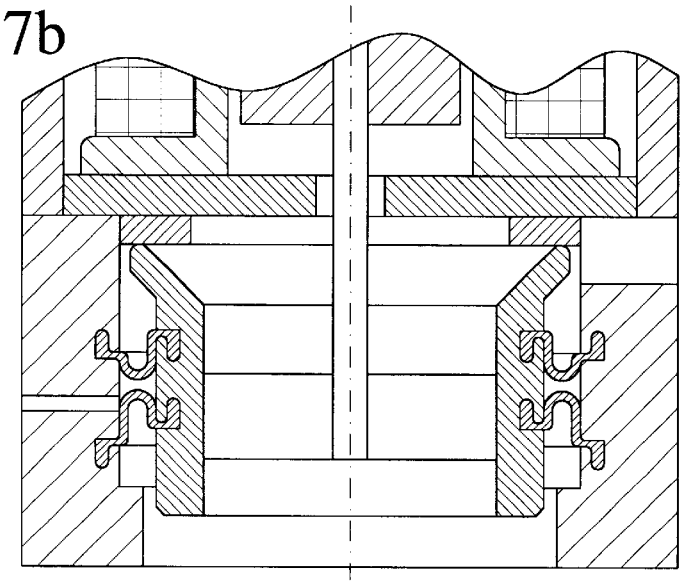
FIG. 7b shows the air spring valve of FIG. 7a in the closed state.

The function of the assembly shown in FIGS. 7a to 7d is identical to that shown in FIGS. 6a and 6b. The difference is only that the friction-burdened collar seal 40 is replaced by two friction-free roll membranes (56, 58). As shown in FIG. 7b, the effective diameter Dw is not changed by closure. The membranes (56, 58) have, during closing, only rolled off at the interior of the valve housing bore 62 and on the outer diameter of the valve body 34. This can be seen from the different lengths in the interior and in the exterior.

Figure 7C:
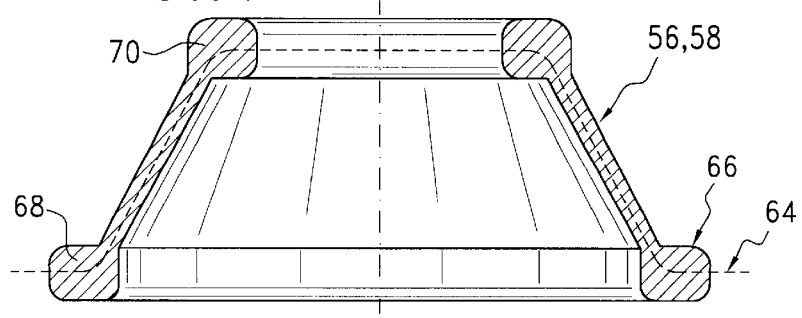
FIG. 7c is a schematic, in longitudinal section, of a roll membrane in accordance with the invention.

The roll membranes (56, 58) must be manufactured with a woven insert 64. The woven insert 64 imparts strength to the rubber 66 and transfers the forces to the attachment beads (68, 70). The rubber 66 only seals. For manufacture, the fabric must be pressed in hat form and, thereafter, the rubber is vulcanized thereto (FIG. 7c). What is critical here is that the fabric hat cannot be of any desired height because the deforming capability of the fabric has limits and therefore a larger height would lead to a reduction in strength.

Figure 7D:
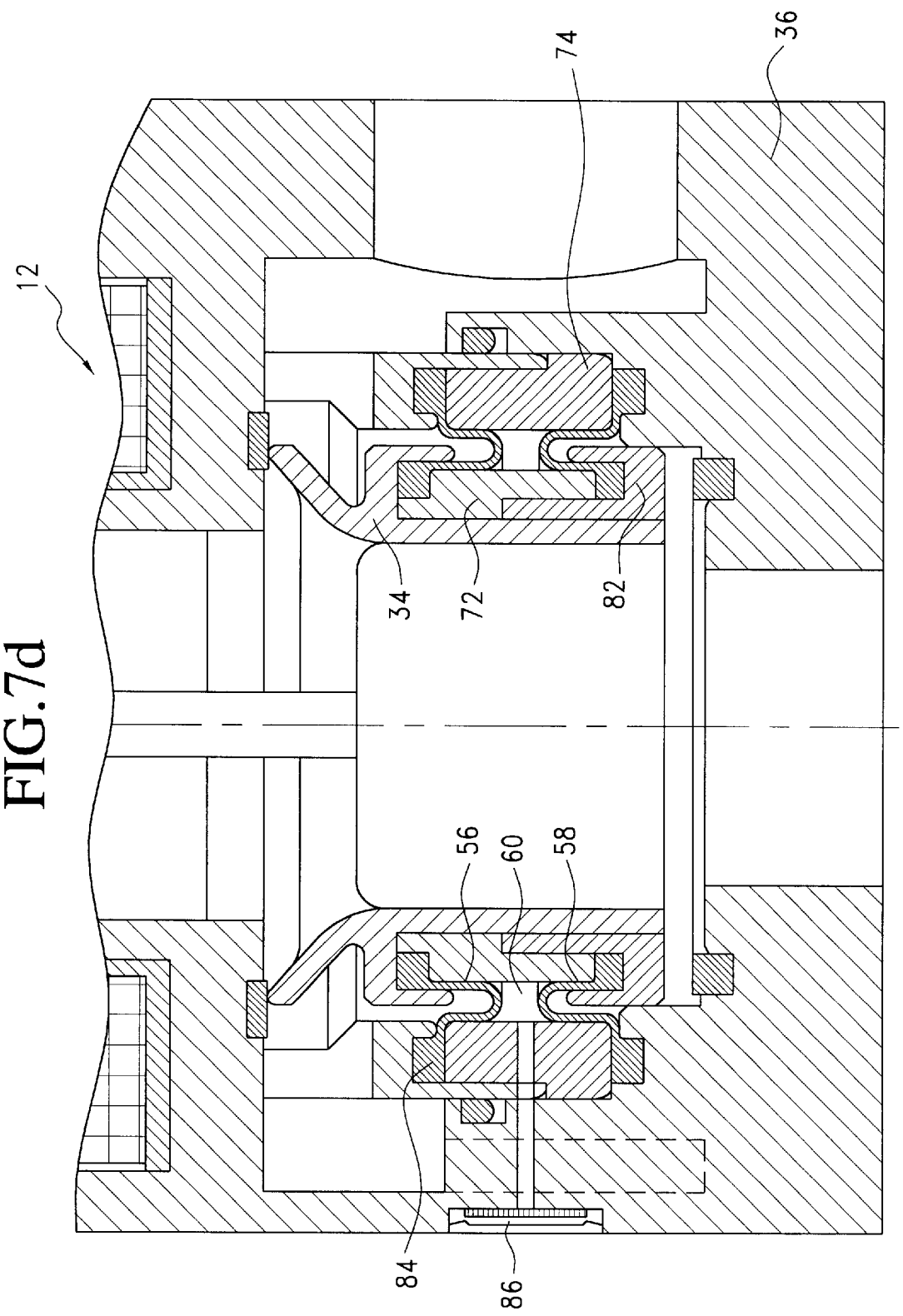
FIG. 7d is a detailed view, in longitudinal section, of the valve according to the invention.

The attachment of the beads (68, 70) is not shown in FIGS. 7a to 7c. To ensure position, the different sleeves must be placed one atop the other. Here, it is important that the intermediate sleeves (72, 74) are so configured that they assume a specific position, that is, that they do not move axially in dependence upon the bead deformation. For this purpose, two (attachment) sleeves (82, 84) hold the intermediate sleeves (72, 74) in their positions (FIG. 7d). Without the exact fixation by means of positioning, gaps could otherwise arise which could lead to leakages.

Reference numeral 86 identifies an air permeable membrane. This membrane seals the valve housing bore 62 in such a manner that no dirt and water can penetrate without, however, significantly hindering the air exchange. Dirt and water would affect the operation and, additionally, possibly lead to corrosion.

Figure 8A:
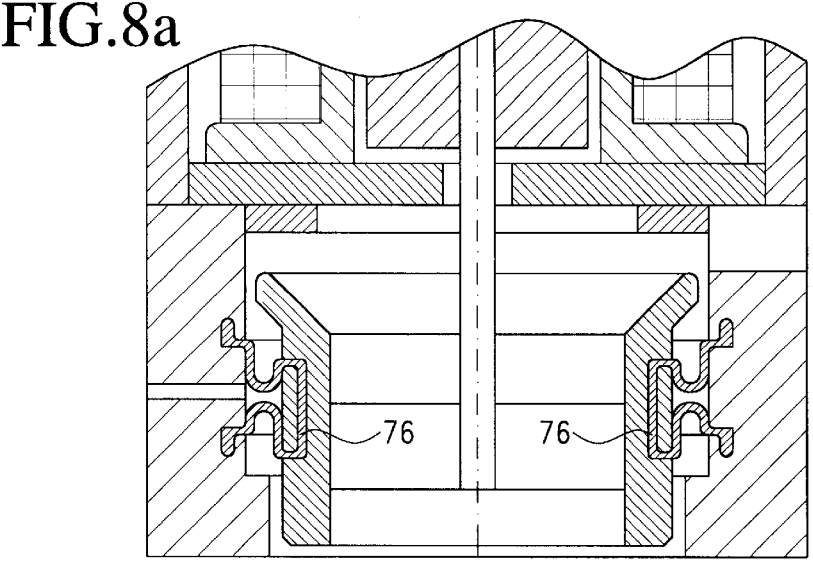
FIG. 8a is a schematic of an alternate embodiment of an air spring valve of the invention shown in the open state and including two roll membranes put together to form a double roll membrane.
Figure 8B:
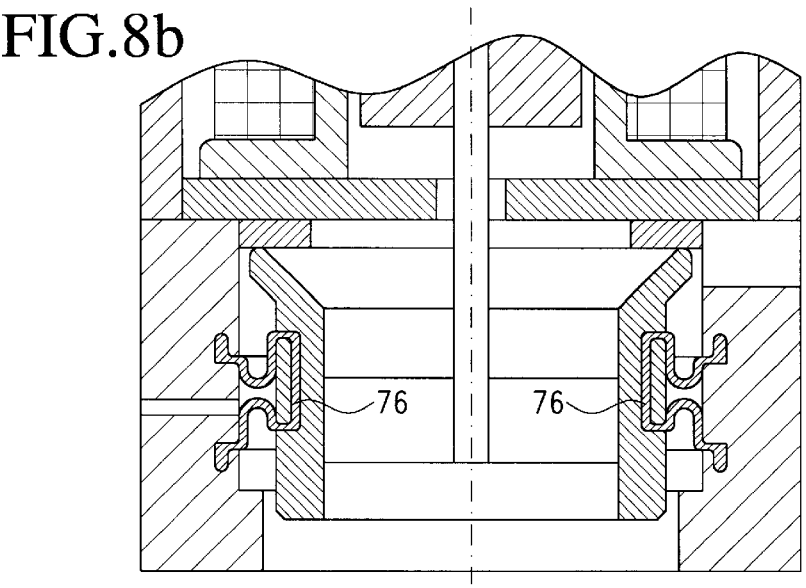
FIG. 8b shows the air spring valve of FIG. 8a in the closed state.
Figure 8C:
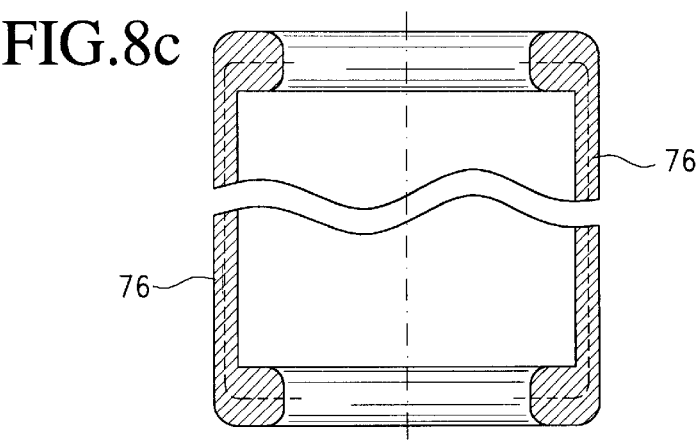
FIG. 8c is detailed view, in longitudinal section, of the double roll membrane according to the invention; and, FIG. 9 is a schematic, in longitudinal section, of an air spring valve configured in accordance with the star-nozzle principle.
Figure 9:
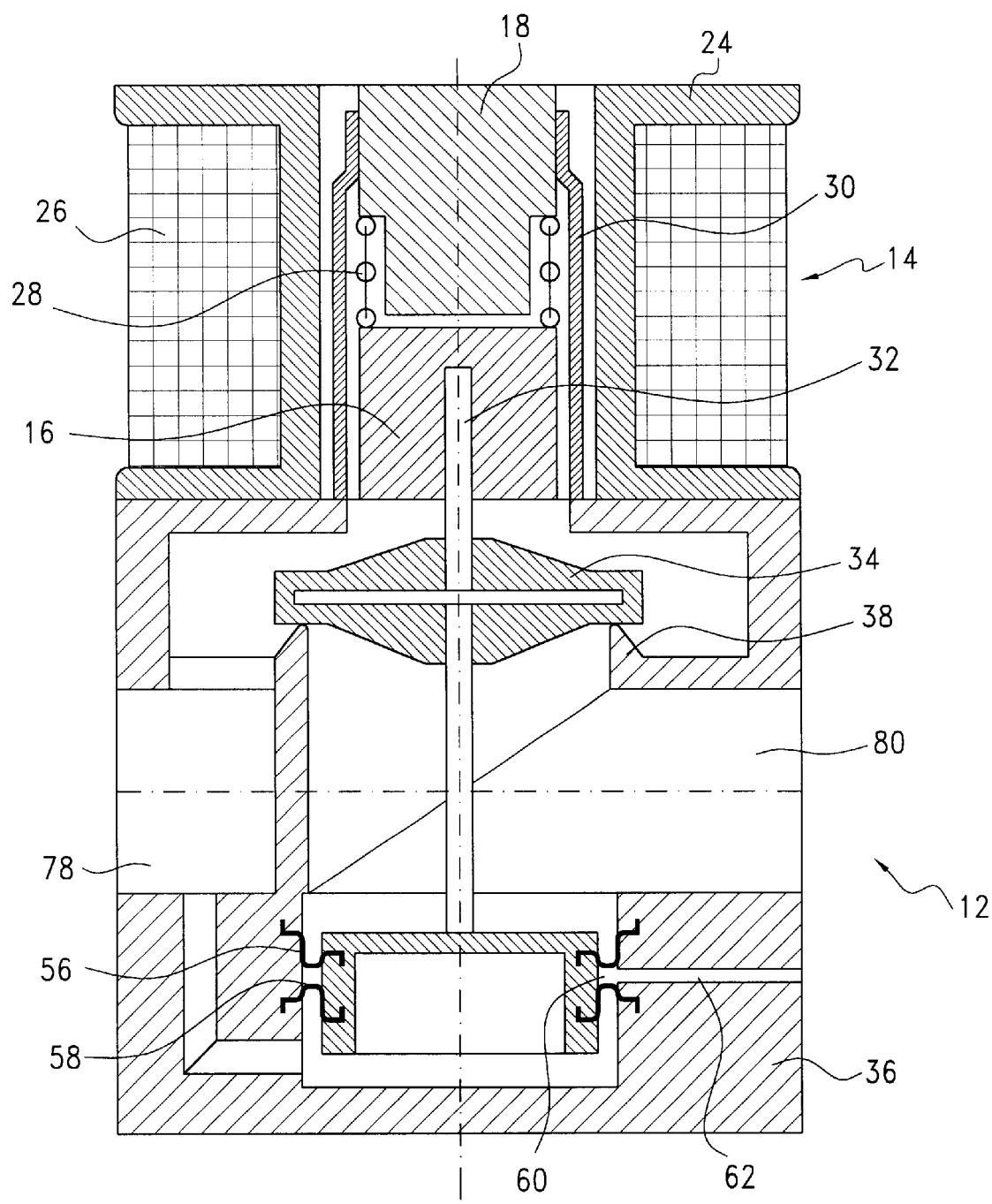

The construction shown in FIGS. 8a to 8c has a double roll membrane 76 and corresponds to the construction in FIGS. 7a to 7d but a hose-shaped membrane fabric is necessary in lieu of a hat-shaped membrane fabric. The advantage of such a hose-shaped membrane 7b is that only a single part has to be manufactured and assembled. The attachment to the valve body 34 is especially much simpler.

It is understood that the foregoing description is that of the preferred embodiments of the invention and that various changes and modifications may be made thereto without departing from the spirit and scope of the invention as defined in the appended claims.

What is claimed is:

1. A motor vehicle air spring comprising:
   an air spring volume;
   an ancillary volume;
   a connecting line connecting said volumes to each other and having a cross section through which air can flow between said volumes;
   a valve unit mounted in said connecting line;
   said valve unit having a valve housing defining a valve seat;
   a valve body movable in said valve housing between a first position wherein said valve body is in contact engagement with said valve seat to close a flow path between said air spring volume and said ancillary volume and a second position wherein said flow path is at least partially open;
   said valve housing and said valve body conjointly defining an interface region;
   first and second roll membranes mounted between said valve body and said housing in said interface region to seal said valve body with respect to said housing at said interface; and,
   said first and second roll membranes being mounted to roll oppositely with respect to each other with the movement of said valve body.

2. The motor vehicle air spring of claim 1, said first and second roll membranes conjointly defining an intermediate space communicating with the atmosphere.

3. The motor vehicle air spring of claim 1, said valve housing defining a cylindrical bore and said valve body having a cylindrical shape for movement in said cylindrical bore so as to cause said first and second roll membranes to have a constant effective diameter (Dw) independent of a deflection of said valve body.

4. The motor vehicle air spring of claim 1, further comprising a first intermediate sleeve for fixing said first and second roll membranes to said valve body and a second intermediate sleeve for fixing said first and second roll membranes to said valve housing.

5. The motor vehicle air spring of claim 1, wherein said first and second roll membranes are joined to form a single double roll membrane.

6. The motor vehicle air spring of claim 5, further comprising a clamping ring for clamping and sealing said double roll membrane to said valve body.

7. The motor vehicle air spring of claim 5, wherein said double roll membrane is vulcanized to said valve body.

8. The motor vehicle air spring of claim 1, wherein said first and second roll membranes are vulcanized to said valve body.

9. The motor vehicle air spring of claim 1, further comprising electromagnetic means for actuating said valve body for movement from one of said positions to the other one of said positions.

10. The motor vehicle air spring of claim 1, further comprising a drive for driving said valve body and said drive being selected from the group consisting of: a step motor, a piezo stack actuator with path translation, a piezo bending element actuator, an electromagnetic actuator and a pneumatic actuator.

11. A motor vehicle air spring comprising:
    an air spring volume;
    an ancillary volume;
    a connecting line connecting said volumes to each other and having a cross section through which air can flow between said volumes;
    a valve unit mounted in said connecting line;
    said valve unit having a valve housing defining a valve seat;
    a valve body movable in said valve housing between a first position wherein said valve body is in contact engagement with said valve seat to close a flow path between said air spring volume and said ancillary volume and a second position wherein said flow path is at least partially open;
    said valve housing and said valve body conjointly defining an annular interface region;
    first and second roll membranes mounted between said valve body and said housing in said annular interface region;
    said first and second roll membranes being mounted to roll oppositely with respect to each other with the movement of said valve body; and,
    said first and second roll membranes being joined to form a single double roll membrane having an annular configuration.

12. The motor vehicle air spring of claim 11, wherein said single double roll membrane of annular configuration defines a longitudinal axis and has first and second longitudinal ends defining respective first and second beads; said first bead being fixedly mounted on said valve body and said second bead being fixedly mounted on said valve housing.

\* \* \* \* \*